(12) United States Patent
Faure

(10) Patent No.: US 11,440,642 B2
(45) Date of Patent: Sep. 13, 2022

(54) AIRCRAFT ACTUATOR TORQUE LIMITER, ACTUATOR, AIRCRAFT AND RELATED PROCESS

(71) Applicant: DASSAULT AVIATION, Paris (FR)

(72) Inventor: Antoine Patrick Faure, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 61 days.

(21) Appl. No.: 17/061,515

(22) Filed: Oct. 1, 2020

(65) Prior Publication Data
US 2021/0101673 A1 Apr. 8, 2021

(30) Foreign Application Priority Data
Oct. 3, 2019 (FR) ...................................... 19 10951

(51) Int. Cl.
*B64C 9/00* (2006.01)
*B64C 13/30* (2006.01)
*B64C 13/50* (2006.01)

(52) U.S. Cl.
CPC ................ *B64C 13/50* (2013.01); *B64C 9/00* (2013.01); *B64C 13/30* (2013.01)

(58) Field of Classification Search
CPC ............ B64C 13/50; B64C 9/00; B64C 13/30
See application file for complete search history.

(56) References Cited

U.S. PATENT DOCUMENTS

| 4,423,803 A | 1/1984 | Malloy | |
| 4,442,928 A * | 4/1984 | Eastman | F02K 1/763 477/185 |
| 4,561,529 A | 12/1985 | McIntosh | |
| 4,660,247 A | 4/1987 | Frohbieter et al. | |
| 5,199,538 A * | 4/1993 | Fischer | F16D 55/38 188/134 |
| 5,454,457 A * | 10/1995 | Sakai | F16D 43/25 192/82 T |
| 8,393,442 B2 * | 3/2013 | Lang | B64D 45/0005 188/134 |

(Continued)

FOREIGN PATENT DOCUMENTS

| CN | 102734359 A | 10/2012 |
| CN | 205204657 U | 5/2016 |

(Continued)

OTHER PUBLICATIONS

Search Report for priority application FR 1910951.

Primary Examiner — Rodney A Bonnette
(74) Attorney, Agent, or Firm — Davidson, Davidson & Kappel, LLC

(57) ABSTRACT

An aircraft actuator torque limiter includes a disengageable torque transmitter between a rotary shaft and a driven member. The disengageable transmitter includes a friction pack including at least one contact member mounted secured in rotation with the rotary shaft and a complementary contact member, mounted secured in rotation with the driven member. The transmitter includes a clamp of the friction pack and a mover of the clamp, able to contract or expand differentially relative to the rotary shaft along the axis of rotation during a temperature variation. The clamp mover is made from a second material having a thermal expansion coefficient different from that of the first material forming the rotary shaft.

16 Claims, 9 Drawing Sheets

(56) References Cited

U.S. PATENT DOCUMENTS

| | | |
|---|---|---|
| 10,151,355 B2 | 12/2018 | Elsesser |
| 2002/0160882 A1 | 10/2002 | Michioka et al. |
| 2008/0312034 A1 | 12/2008 | Shultz et al. |

FOREIGN PATENT DOCUMENTS

| | | |
|---|---|---|
| CN | 107218389 A | 9/2017 |
| CN | 107884183 A | 4/2018 |
| CN | 109211332 A | 1/2019 |
| DE | 102008021171 A1 | 12/2008 |
| GB | 2286437 A | 8/1995 |
| GB | 2327731 A | 2/1999 |
| JP | S4914848 A | 2/1974 |
| KR | 20020083507 A | 11/2002 |
| WO | WO91/06783 A1 | 5/1991 |

\* cited by examiner

AIRCRAFT ACTUATOR TORQUE LIMITER, ACTUATOR, AIRCRAFT AND RELATED PROCESS

The present disclosure relates to an aircraft actuator torque limiter, configured to be mounted between a motor and an actuating member able to be moved by the motor, the torque limiter comprising:
- a rotary shaft rotating about an axis of rotation, formed from a first material;
- a driven member able to be driven in rotation about the axis of rotation by the rotary shaft;
- one of the rotary shaft and the driven member being configured to be connected to the motor, the other of the rotary shaft and the driven member being configured to be connected to the movement mechanism of the actuating member;
  - a disengageable torque transmission system between the rotary shaft and the driven member, the disengageable system comprising a friction pack including at least one contact member mounted secured in rotation with the rotary shaft and a complementary contact member, mounted secured in rotation with the driven member, the complementary contact member being able to be rotated by the rotary shaft about the axis of rotation jointly with the contact member if the torque applied between the contact member and the complementary contact member is below a torque threshold value, and being rotative relative to the contact member about the axis of rotation if the torque applied between the contact member and the complementary contact member is greater than or equal to the threshold value;
- the disengageable system including a clamping member of the friction pack comprising the contact member and the complementary contact member, along the axis of rotation.

The actuator is in particular configured to be used to deploy mobile aircraft surfaces, particularly flaps or control surfaces.

BACKGROUND

In most modern airplanes, the actuators of mobile surfaces are electromechanical actuators.

An electromechanical actuator generally comprises an electric motor and an actuating rod movable using a movement mechanism driven by the motor. The electrical supply of the motor of the actuator, controlled from the cockpit of the airplane, makes it possible to move the rod over the required travel.

In order to protect the actuator and the parts moved by the latter, it is known to insert a torque limiter between the motor and the movement mechanism of the rod. The torque limiter is tared (for example by adjustment on table) to a certain triggering value in order to limit the force developed by the actuator in case of failure, in particular during a blockage of the control surface, in case of malfunction of the coupling, and/or in case of a saturating aerodynamic force.

The dimensioning of the flight controls, in particular of the actuators provided for these controls, must respond to the worst operating case, in terms of load, speed, minimum usage temperature, and jamming.

In this respect, the cold that the aircraft experiences is a significant factor in the dimensioning of the actuators. Thus, the very low temperatures (close to −55° C.) play a dimensioning role on the response times of the actuator, the developed forces and the movement speeds. As a result, these actuators are dimensioned for these worst operating cases, by increasing their power and their speed, in order to guarantee correct functioning in cold weather.

However, the triggering torque, at which the torque limiter disengages and ceases to transmit a torque, varies depending on the temperature.

The thermal sensitivity of the limiter decreases the triggering torque with a decrease in the temperature. Furthermore, the cold increases the internal friction and decreases the overall efficiency of the actuator. As a result, the cold decreases the force available to move the control surfaces due to the increase in the viscosities of the lubricants present in the mechanisms.

The actuator must be capable of moving the control surface under a cold maximum aerodynamic force without disengaging the torque limiter. The limiter must therefore make it possible to overcome the friction due to the cold and the load to be moved.

This creates a difficulty, because at ambient temperature, the internal friction being much lower, producing a better efficiency, the force developed by the actuator is much greater than when cold for a same limiter taring.

This requires overdimensioning the parts located downstream of the actuator, as well as the structure of the airplane.

One aim of the present disclosure is to obtain an aircraft actuator torque limiter operating more efficiently at low temperatures and thus not requiring overdimensioning the parts located downstream of the actuator, as well as the structure of the airplane, in particular during maneuvers at ambient temperature or hot.

SUMMARY

To that end, the present disclosure relates to a torque limiter of the aforementioned type, characterized in that the disengageable system includes a movement member of the clamping member, able to contract or expand differentially relative to the rotary shaft and to the friction pack along the axis of rotation during a temperature variation, the movement member being made from a second material having a thermal expansion coefficient different from the thermal expansion coefficient of the first material forming the rotary shaft.

The torque limiter according to the present disclosure may comprise one or more of the following features, considered alone or according to any technically possible combination(s):
- the second material has a thermal expansion coefficient greater than the thermal expansion coefficient of the first material,
- the absolute value of the difference between the thermal expansion coefficients of the first material and the second material is greater than $10^{-6}$ mm/mm/° C.,
- the movement member is housed in a bore arranged in the rotary shaft,
- the movement member is a rod,
- the disengageable system includes a transmission stop secured in translation with the movement member, the transmission stop being able to move toward the clamping member in order to increase the clamping applied on the stack comprising the contact member and the complementary contact member along the axis of rotation during a differential contraction of the movement member relative to the rotary shaft and to move away from the clamping member in order to decrease the clamping applied on the stack comprising the contact member and the complementary contact member along the axis of rotation during a differential expansion of the movement member relative to the rotary shaft, the rotary shaft defines a blocking bearing of the longitudinal movement of the movement member during a differential expansion between the rotary shaft and the movement member, the clamping member includes a spring washer, the friction pack includes an intermediate friction member between the contact member and the complementary contact member, it includes a rotary input member secured in rotation with the rotary shaft, the rotary input member being translatable on the rotary shaft along the axis of rotation during the contraction or the differential expansion of the movement member, it includes a smooth guide bearing of the driven member, the driven member being mounted rotating on the rotary shaft via the smooth guide bearing, the rotary shaft delimiting an annular housing for receiving the smooth guide bearing.

The present disclosure also relates to an aircraft actuator including:
a motor;
a mobile actuating member;
a movement mechanism of the actuating member, able to be driven by the motor; and
a torque limiter as described above, inserted between the motor and the movement mechanism of the actuating member.

The actuator according to the present disclosure may comprise one or more of the following features, considered alone or according to any technically possible combination(s):

the motor is able to rotate the rotary shaft, the driven member being connected to the movement mechanism of the actuating member, The present disclosure relates to an aircraft, including a mobile surface, the mobile surface advantageously being a flap, the aircraft including an actuator as previously described, able to move the mobile surface.

The present disclosure also relates to a method for using an aircraft actuator including the following steps:
providing an actuator as described above, at a first temperature;
during a temperature variation, differential contraction or expansion of the movement member relative to the rotary shaft along the axis of rotation.

BRIEF DESCRIPTION OF THE DRAWINGS

The present disclosure will be better understood upon reading the following description, provided solely as an example, and in reference to the appended drawings, in which.

DETAILED DESCRIPTION

Figure 1:
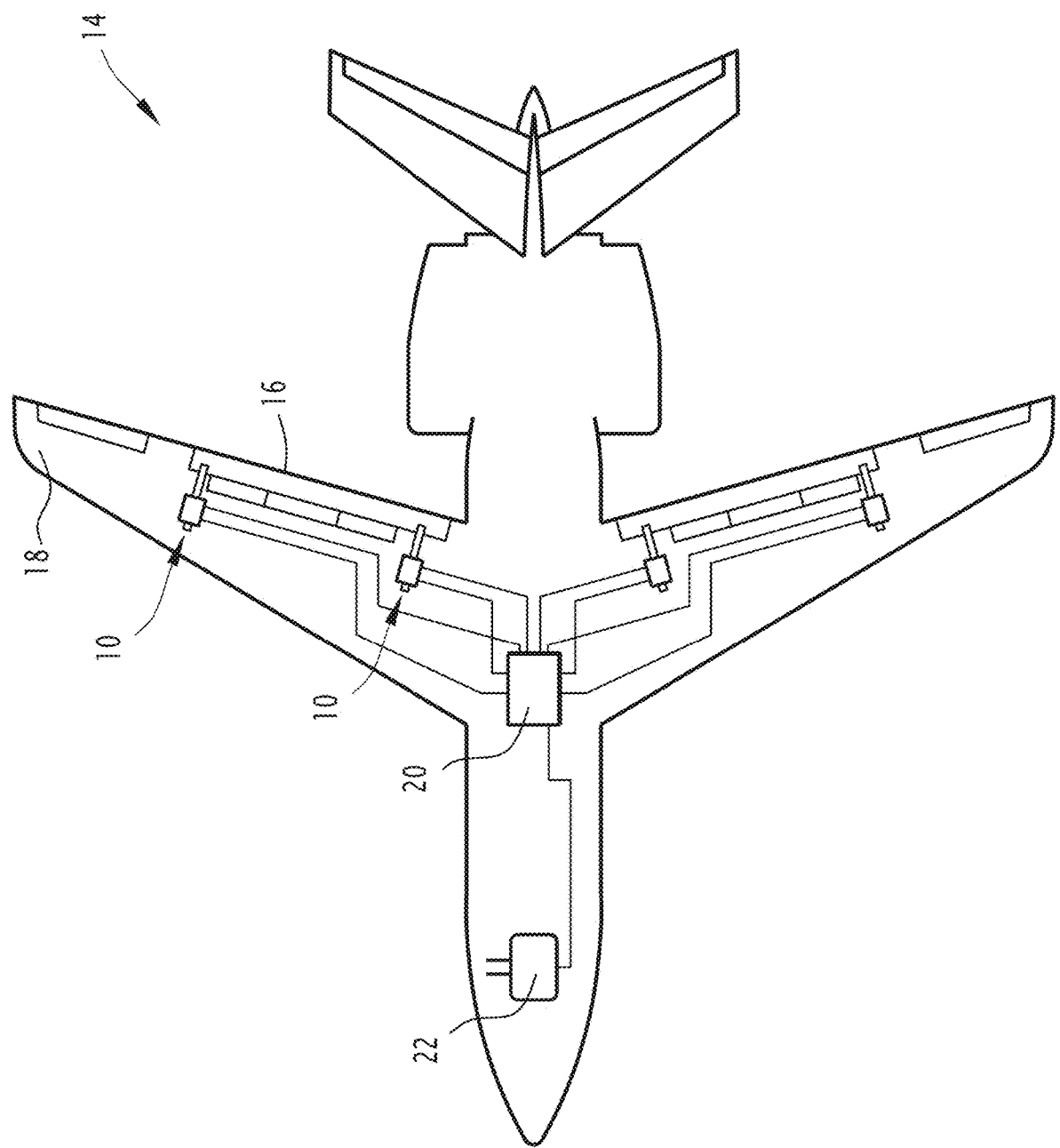
FIG. 1 is a schematic top view of a first aircraft equipped with actuators according to the present disclosure.

A first actuator 10 provided with a torque limiter 12 according to the present disclosure is configured to be used in an aircraft 14 shown in FIG. 1. The aircraft 14 is for example a civil aircraft, in particular a business jet. In a variant, the aircraft 14 is a military airplane or a drone.

The actuator 10 is an electromechanical actuator configured to allow the deployment of a mobile surface of the aircraft 14. The mobile surface is in particular a control surface, or a flap 16 deployed from a wing 18 of the aircraft.

In a variant, the actuator 10 is used to move flight control surfaces of the aileron, elevator, rudder type actuated by electromechanical flight controls equipped with friction torque limiters 12 according to the present disclosure. More generally, the present disclosure applies to any actuator equipped with a torque limiter that may be subject to great operating temperature amplitudes.

To control the actuator 10, the aircraft 14 includes a control unit 20 electrically connected to each actuator 10 and to the cockpit 22 in order to activate and/or deactivate the actuator 10 and to allow the movement of the mobile surface upon a maneuvering order from the cockpit 22.

In the example illustrated in FIG. 1, the flap 16 is controlled by two actuators 10 according to the present disclosure, each actuator 10 actuating one side of the flap 16.

Figure 2:
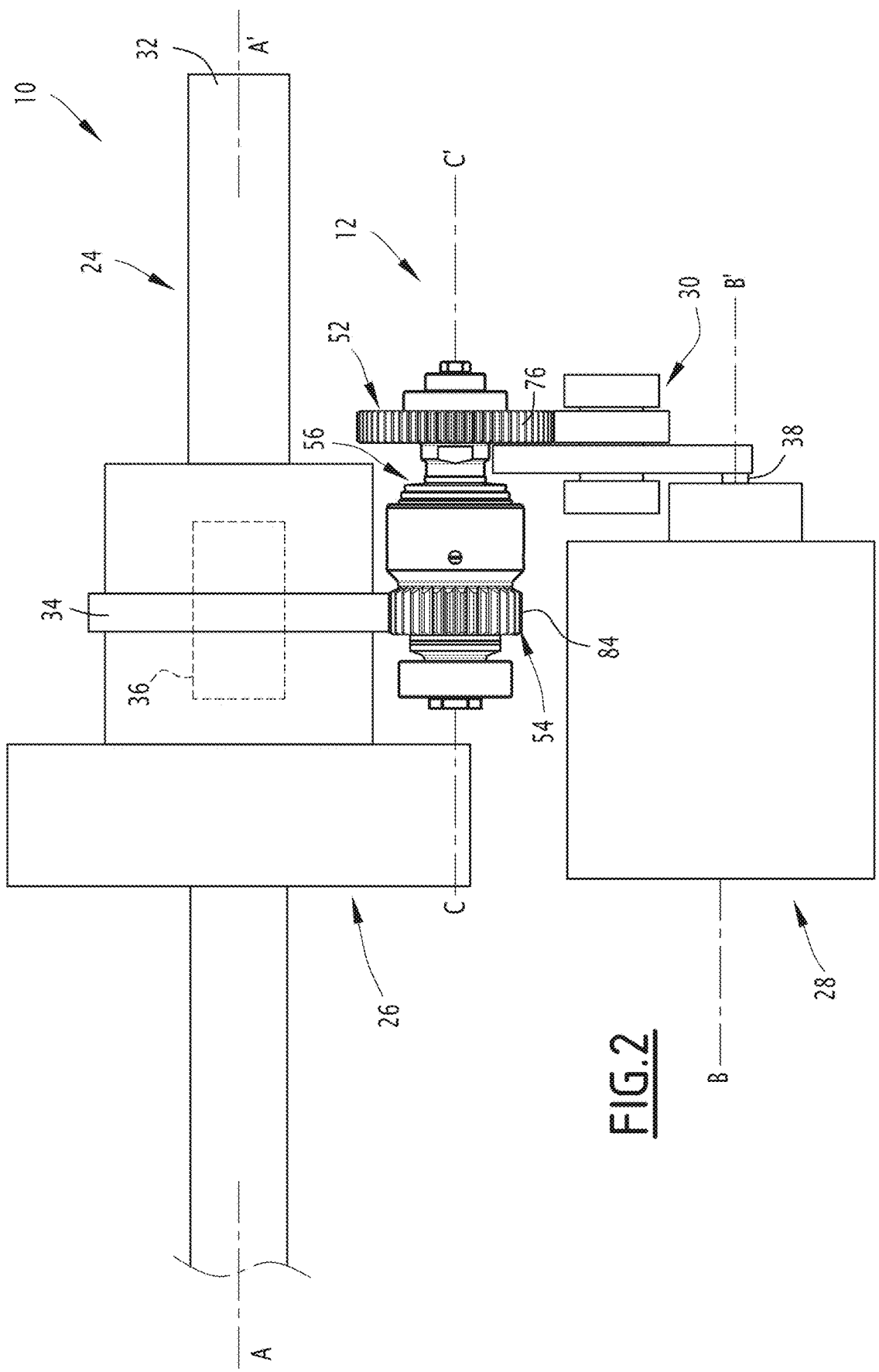
FIG. 2 is a schematic view of an aircraft actuator according to the present disclosure, provided with a torque limiter.

In reference to FIG. 2, the actuator 10 according to the present disclosure includes a mobile actuating member 24, a mechanism 26 for moving the mobile actuating member 24 and an electric motor 28 advantageously provided with a reduction gear 30.

The actuator 10 includes, between the electric motor 28 and the movement mechanism 26, the torque limiter 12 according to the present disclosure.

In this example, the mobile actuating member 24 includes a rod 32 translatable along an axis A-A' relative to the movement mechanism 26. The rod 32 is outwardly provided with a thread (not shown) cooperating with the movement mechanism 26 in order to translate the rod 32.

The movement mechanism 26 includes a rotary member 34 configured to be rotated by the motor 28, via the torque limiter 12 and a movement conversion mechanism 36 able to convert the rotation of the rotary member 34 into a translational movement of the rod 32.

The electric motor 28 includes an output shaft 38. In this example, the output shaft 38 is positioned along an axis B-B' parallel to the axis A-A'. The output shaft 28 is mechanically connected to the torque limiter 12, via the reduction gear 30, when the latter is present.

In reference to FIGS. 2 to 4, the torque limiter 12 is able to allow the rotational driving of the movement mechanism 26, and subsequently the movement of the rod 32, under the effect of the rotation of the output shaft 38 of the electric motor 28, until a torque threshold value transmitted through the torque limiter 12. The torque limiter 12 is able to disengage, in order to prevent the transmission of movement between the electric motor 28 and the movement mechanism 26, when the torque applied through the torque limiter 12 is greater than the torque threshold value.

As visible in FIGS. 2 to 5, the torque limiter 12 includes a rotary shaft 50 rotating about an axis of rotation C-C', mounted on rolling bearings 51A, 51B.

The torque limiter 12 comprises a rotary input member 52, driven in rotation by a gear train connected to the motor 28, and secured in rotation with the rotary shaft 50, and a driven rotary member 54, able to be rotated by the rotary shaft 50 below the torque threshold value.

The torque limiter 12 further includes a disengageable system 56 for transmitting torque between the rotary shaft 50 and the driven rotary member 54, able to disengage beyond the torque threshold value.

Figure 4:
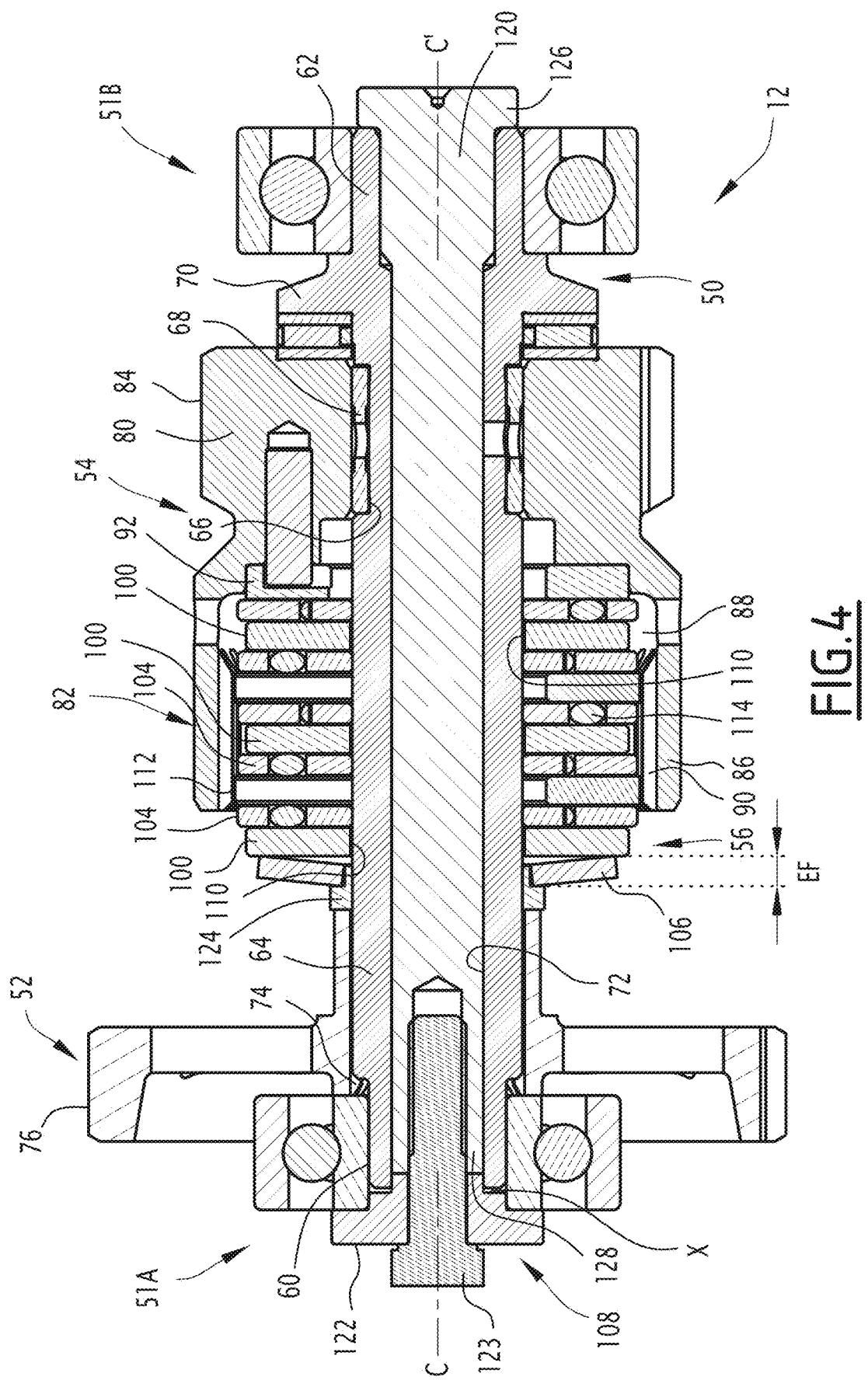
FIG. 4 is a sectional view along a median axial plane of the torque limiter of FIG. 3, when the torque limiter is subject to cold.

In reference to FIG. 4, the rotary shaft 50 defines, at its ends 60, 62, smooth regions for wedging of the ball bearings 51A, 51B. The rotary shaft 50 defines, between the smooth regions, at least one fluted region 64.

In this example, the rotary shaft 50 further delimits an annular housing 66 for receiving a smooth bearing 68, here in the form of two half-shells, guiding the rotation of the driven rotary member 54. The rotary shaft 50 further includes a rear stop ring 70.

In this example, the rotary shaft 50 defines a central bore 72 with axis C-C', which opens out at the ends 60, 62 of the rotary shaft 50.

The axis C-C' of rotation of the rotary shaft 50 here is parallel to the axis A-A' and the axis B-B'.

The rotary shaft 50 is made from a first material, in particular a metal such as steel. The first material has a first thermal expansion coefficient for example of less than $15 \times 10^{-6}$ mm/mm/° C., in particular equal to $11 \times 10^{-6}$ mm/mm/° C. for steel.

The rolling bearings 51A, 51B are mounted at the ends 60, 62 of the shaft 50 on the smooth regions.

Intermediate axial play 74 is provided between the rolling bearing 51A located on the first end 60 in order to allow a translation of the rolling bearing 51A along the axis C-C', as will be seen below.

On the contrary, the rolling bearing 51B located on the second smooth region 62 is wedged against the rear ring 70.

The rotary input member 52 here is formed by a toothed wheel engaged securely in rotation on the fluted intermediate region 64. Thus, the rotary input member 52 is secured in rotation about the axis C-C' with the rotary shaft 50.

The rotary input member 52 is inserted on the rotary shaft 50 between the rolling bearing 51A and the disengageable system 56. It is translatable along the axis C-C' on the flutings of the fluted intermediate region 64.

Figure 3:
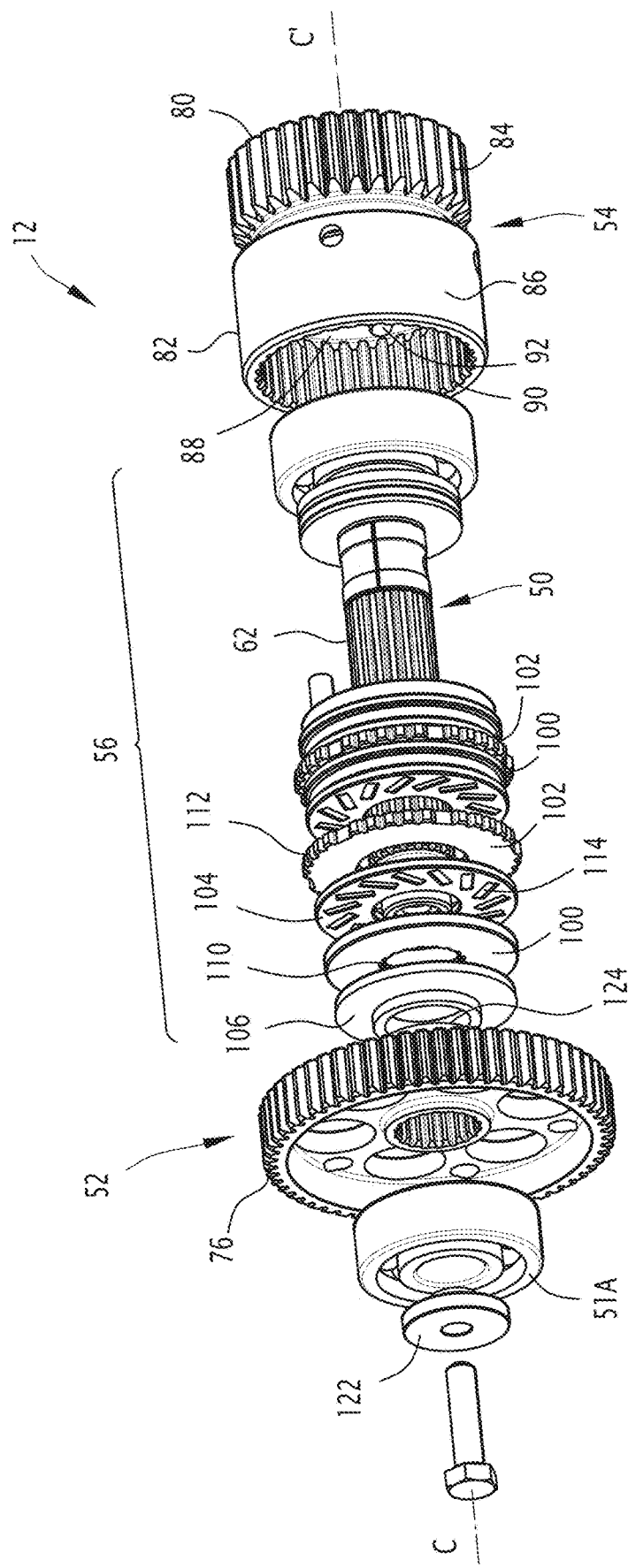
FIG. 3 is an exploded perspective view of the torque limiter of the aircraft actuator of FIG. 2.

In the example shown in FIGS. 3 and 4, the rotary input member 52 comprises an outer peripheral toothing 76 able to cooperate with the reduction gear 30 and/or with the electric motor 28 in order to allow the joint rotational driving of the rotary input member 52 and the rotary shaft 50 about the axis C-C', during the rotation of the output shaft 38 of the motor 28.

The driven rotary member 54 includes a lining 80 bearing on the output shaft 38 and a sleeve 82 cooperating with the disengageable system 56, mounted around the disengageable system 56.

The lining 80 is mounted rotating about the shaft 50, bearing on the smooth guide bearing 68. It outwardly has a peripheral toothing 84 engaged on the rotary member 34 of the movement mechanism 26.

The cooperating sleeve 82 protrudes axially from the lining 80. It has a peripheral wall 86 delimiting an inner cylindrical cavity 88 receiving part of the shaft 50 and at least part of the disengageable system 56.

The peripheral wall 86 is provided with an inner toothing 90 protruding radially toward the axis C-C', in order to cooperate with the disengageable system 56.

The lining 80 delimits a bottom of the cavity 88, on an axial side thereof. The bottom of the cavity 88 is provided with at least one axial wedge 92 mounted fixed in the lining 80. The lining 80 emerges axially on another axial side thereof.

In reference to FIGS. 3 and 4, the disengageable system 56 includes a plurality of contact members 100, secured in rotation with the rotary shaft 50, a plurality of complementary contact members 102, secured in rotation with the driven member 54, each complementary contact member 102 being inserted between two contact members 100.

The disengageable system 56 further includes, between each contact member 100 and each complementary contact member 102, a friction member 104 able to allow a torque transmission between the contact member 100 and the complementary contact member 102, below the torque threshold value.

The disengageable system 56 further includes an elastic clamping member 106 for each contact member 100 against the complementary contact member 102 via the friction member 104, and according to the present disclosure, a mechanism 108 for moving the clamping member 106, during temperature variations.

In this example, each contact member 100 is formed by a disc pierced in its center, and provided with an inner toothing 110 engaged on the fluted intermediate region 64.

Each complementary contact member 102 is also formed by a disc pierced in its center and having a peripheral outer toothing 112 engaged in the inner toothing 90 of the driven member 54.

The complementary contact member 102 is mounted freely rotating about the fluted intermediate region 64, without engagement with the flutings of the intermediate region 64.

The friction member 104 is formed by an intermediate disc inserted between each contact member 100 and the adjacent complementary contact member 102. Each friction member 104 is mounted freely rotating about the fluted intermediate region 64, without engagement with the flutings of the intermediate region 64.

In the example shown in FIG. 3, the intermediate disc is provided with a plurality of rotary needles 114 emerging on either side of the intermediate disc in order to come into contact respectively with the contact member 100 and with the complementary contact member 102.

The disengageable system 56 thus comprises at least one friction pack of a contact member 100, a friction member 104 and a complementary contact member 102 perpendicular to the axis C-C' of rotation, between the wedge 92 at the bottom of the cavity 88 of the cooperating sleeve 82 and the clamping member 106.

The clamping member 106 is for example formed by a spring washer (also called "Belleville" or "Schnorr" washer or "elastic washer"). This spring washer here has a frusto-conical shape, with apex oriented away from the contact members 100 and complementary contact members 102. In this example, a base of the clamping member 106 is pressed against a contact member 100.

The clamping member 106 is able to apply an axial force along the axis C-C' in order to clamp each stack made up of a contact member 100, a complementary contact member 102 and a friction member 104 inserted between the contact member 100 and the complementary contact member 102. The spring washer has a small space requirement and a greater stiffness than a spiral wire spring.

The axial force applied to the clamping member 106 by the movement mechanism 108 of the clamping member 106 defines the threshold value of the torque that may be transmitted by the contact members 100 to the complementary contact members 102.

When the torque applied between the rotary shaft 50 on the one hand, and the driven rotary member 54 on the other hand is below the torque threshold value defined by the clamping of the clamping member 106, each complementary contact member 102 is driven in rotation about the axis C-C' by a contact member 100 during the rotation of the rotary shaft 50. The disengageable system 56 is then engaged.

When the torque applied between the rotary shaft 50 on the one hand, and the driven rotary member 54 on the other hand is above the torque threshold value defined by the clamping of the clamping member 106, each complementary contact member 102 remains free in rotation about the axis C-C' relative to the contact member 100 and the friction member 104 ensures the sliding of the contact member 100 relative to the complementary contact member 102 during the rotation of the contact member 100. The disengageable system 56 is then disengaged.

The movement mechanism 108 includes a movement member 120 able to contract or expand differently relative to the rotary shaft 50, along the axis C-C' during a temperature variation.

The movement mechanism 108 also includes a movement transmission stop 122, movable jointly with the movement member 120, screwed on the rod by an adjusting screw 123 and advantageously, in this example, a secondary stop 124 bearing on the clamping member 106.

The movement member 120 here is formed by a rod inserted into the bore 72 arranged within the rotary shaft 50.

The rod is wedged at a first end 126 by a head arranged bearing on an end 62 of the shaft 50. It includes a second end 128 freely translatable relative to the shaft 50 along the axis C-C', on which the transmission stop 122 is mounted.

The movement member 120 is formed from a second material, different from the first material forming the rotary shaft 50 or forming the or each friction pack of the disengageable system 56 including each contact member 100, each complementary contact member 102 and each friction member 104 of the axial wedge 92.

The second material has a second thermal expansion coefficient different from that of the first material forming the rotary shaft 50. The second material, here for example, the aluminum, has a thermal expansion coefficient greater than that of the first material that makes up the rotary shaft 50 and the or each friction pack of the disengageable system 56, advantageously of at least $10^{-6}$ mm/mm/° C. This thermal expansion coefficient is in particular greater than $20\times10^{-6}$ mm/mm/° C., in particular equal to $23\times10^{-6}$ mm/mm/° C. in the case of aluminum.

Consequently, during a temperature variation, for example during a temperature increase or decrease, the respective expansion or contraction of the movement member 120 along the axis C-C' is different from the respective expansion or contraction of the rotary shaft 50 along the same axis by a factor greater than 1.5 and in particular equal to 2 for a same length.

As a result, the second end 128 of the movement member 120 is able to move along the axis C-C' relative to the rotary shaft 50. It is for example able to move the transmission stop 122 away from the clamping member 106 during a temperature increase, and to move the stop 122 of the clamping member 106 closer during a temperature drop.

The transmission stop 122 is positioned bearing axially on the primary rolling bearing 51A. It is defined to allow an axial movement along the axis C-C' and to be separated by a residual functional axial play X (see FIG. 4) from the end 60 when the movement member 120 reaches its smallest dimension caused by the cold.

The screw 123 is able to create the axial force, the intensity of which is controlled by the thickness of the transmission stop 122.

The secondary stop 124 is positioned bearing on the one hand on the clamping member 106, and on the other hand on the rotary input member 52.

The rolling bearing 51A and the rotary input member 52 are stacked between the transmission stop 122 and the secondary stop 124. The movement of the transmission stop 122 creates a translation along the axis C-C' of the clamping member 106 via the rolling bearing 51A, the rotary input member 52 and the secondary bearing stop 124.

Thus, during a temperature increase, the movement member 120 expands more than the parts that keep the clamping member 106 under load. The transmission stop 122 moves away from the clamping member 106, allowing a decrease in the load applied to the clamping member 106 and decreasing the clamping force between each contact member 100 and each complementary contact member 102. This causes a relative decrease in the disengagement torque threshold value.

On the contrary, during a temperature decrease, the movement member 120 expands more than the parts that keep the clamping member 106 under load. The transmission stop 122 moves closer to the clamping member 106, increasing the preloading of the clamping member 106, which deforms and produces an increase in the clamping between each contact member 100 and each complementary contact member 102. This causes a relative increase in the torque threshold value.

The torque limiter 12 is thus heat-sensitive.

The operation of the torque limiter 12 during an activation of the actuator 10 will now be described.

Initially, when the actuator 10 must be activated, for example in order to deploy a mobile surface such as a flap 16, the electric motor 28 is supplied with electricity, causing a rotation of its output shaft 38. This rotation is transmitted to the rotary input member 52 via the reduction gear 30, if the latter is present.

The rotation of the rotary input member 52 about the axis C-C' in turn jointly drives the rotary shaft 50, and the contact members 100 secured in rotation with the rotary shaft 50.

When the torque applied between the contact members 100 and the complementary contact members 102 is below the torque threshold value, the clamping between the contact members 100 and the complementary contact members 102 via the friction members 104 causes the rotational driving of the complementary contact members 102 about the axis C-C' and the joint rotation of the driven rotary member 54 about the axis C-C'.

The driven member 54 then drives the rotation of the rotary member 34 of the movement mechanism 26, producing a movement of the mobile actuating member 24.

If the mobile actuating member 24 is blocked, the torque applied between the contact members 100 and the complementary contact members 102 via the friction members 104 increases beyond the threshold value. The disengageable system 56 disengages. The contact members 100 are driven in rotation relative to the complementary contact members 102 about the axis C-C', without transmitting their rotational movement to the complementary contact members 102.

The torque limiter 12 being heat-sensitive, during a temperature decrease, for example if the actuator 10 operates at a low temperature of the order of −40° C. as illustrated in FIG. 4, a differential contraction occurs between the rotary shaft 50 and the movement member 120, producing a movement of the transmission stop 122 toward the clamping member 106. This movement is transmitted from the transmission stop 122 to the clamping member 106, advantageously by the stack of the rolling bearing 51A, the rotary input member 52 and the secondary bearing stop 124.

The clamping member 106 contracts axially to have a cold axial extension EF.

The clamping force between the contact members 100 and the complementary contact members 102 via the friction members 104 then increases and partially offsets the decrease in the torque threshold value that may be observed at low temperatures.

Figure 5:
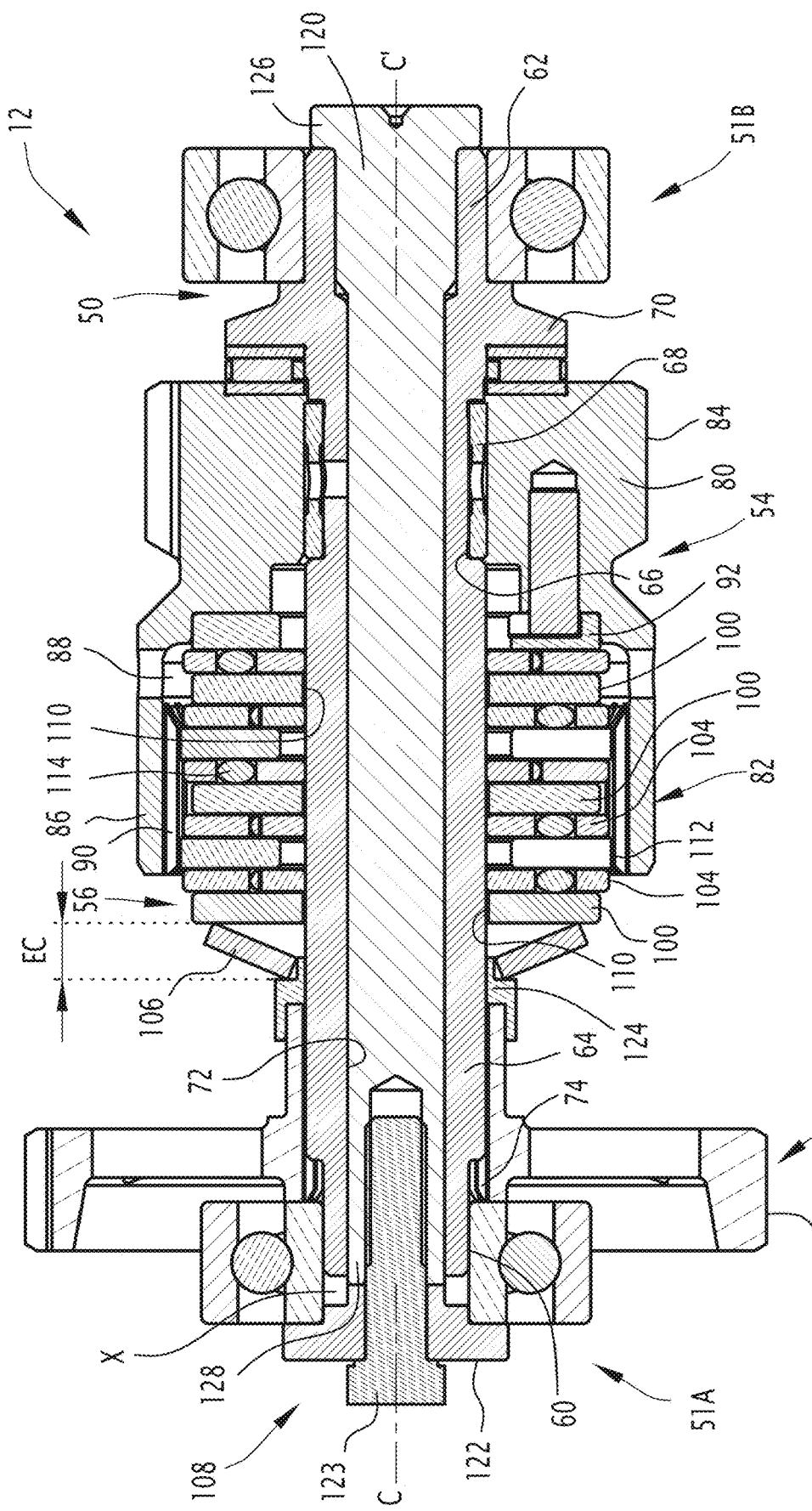
FIG. 5 is a view similar to FIG. 4, when the torque limiter is subject to heat.

On the contrary, when the temperature increases, as illustrated in FIG. 5, the differential expansion between the rotary shaft 50 and the movement member 120 produces a movement of the transmission stop 122 away from the clamping member 106. The clamping member expands axially to have a hot axial extension EC greater than the cold axial extension EF. The clamping force applied between the contact members 100 and the complementary contact members 102 decreases.

This produces a decrease of the torque threshold value at which the system disengages, despite the increase in this threshold value due to the temperature increase.

The movement of the transmission stop 122 along the axis C-C' is proportional to the length of the parts present in the stack of the disengageable system and of the movement member 120.

In this example, the movement reaches 0.07 mm for temperatures varying from +85° C. to −55° C. It has been intentionally exaggerated in FIGS. 4 and 5. This movement is even greater when the materials have distant expansion coefficients (titanium, for example, because its thermal expansion coefficient is even smaller than that of steel. ($8.6 \times 10^{-6}$ mm/mm/° C.)).

Figure 9:
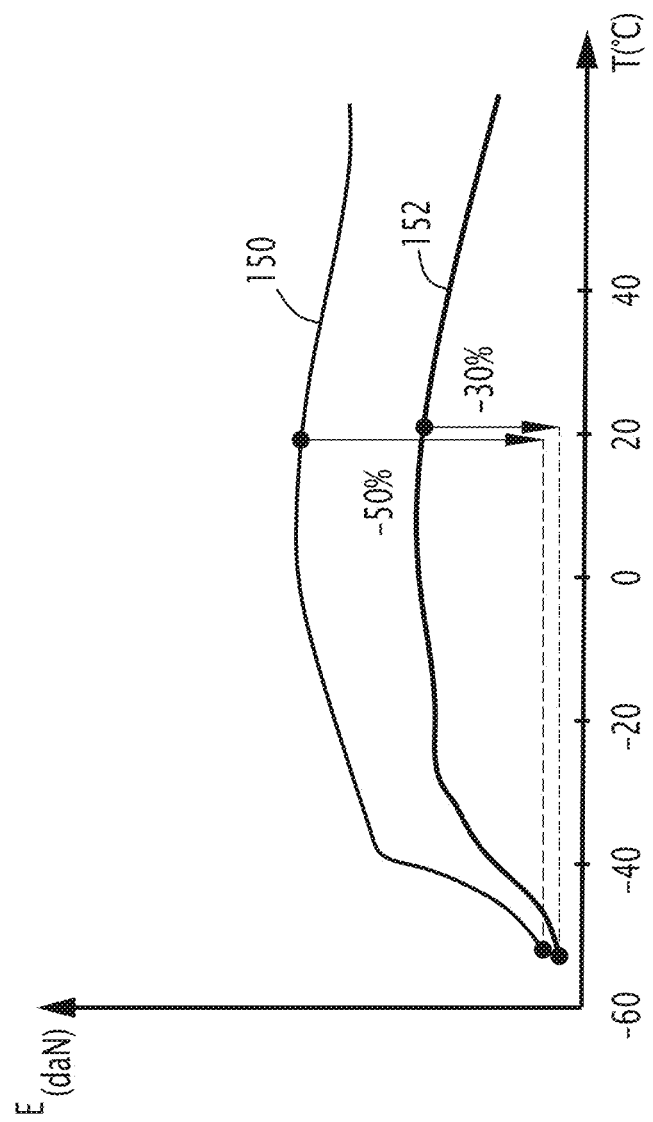
FIG. 9 illustrates triggering torque curves as a function of temperature for a torque limiter of the state of the art and for a torque limiter according to the present disclosure.

This advantageous working of the torque limiter 12 according to the present disclosure can be seen in FIG. 9. The curve 150 illustrates the behavior of the force available at the actuator that is produced for a torque limiter of the state of the art as a function of the temperature. The abatement of the available force observed between 20° C. and −55° C. is of the order of 50%.

Compared to the curve 152, the torque limiter 12 according to the present disclosure, although having a threshold value at low temperatures close to that of the torque limiter of the state of the art, greatly limits the increase of the triggering torque threshold value at higher temperatures relative to the torque limiter of the state of the art. The abatement of the available force observed between 20° C. and −55° C. here is of the order of only 30%.

Thus, the dimensioning of the parts located downstream of the actuator 10 can be modified in order to lighten their structure, since it is no longer necessary for these parts to be as mechanically strong at ambient temperature, in light of the torque limitation that will be applied.

Figure 6:
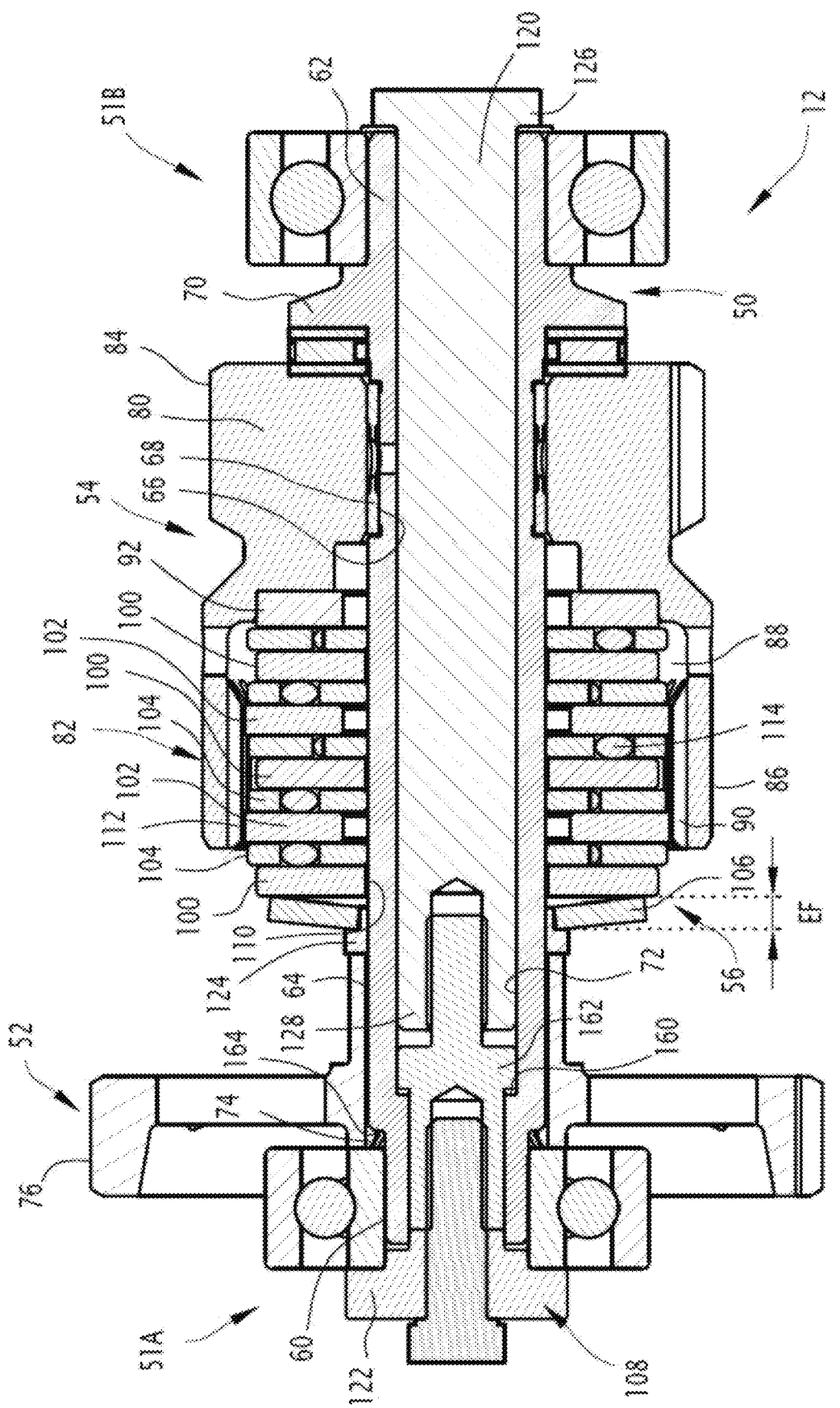
FIG. 6 is a view similar to FIG. 4 of a second torque limiter according to the present disclosure subject to cold.
Figure 7:
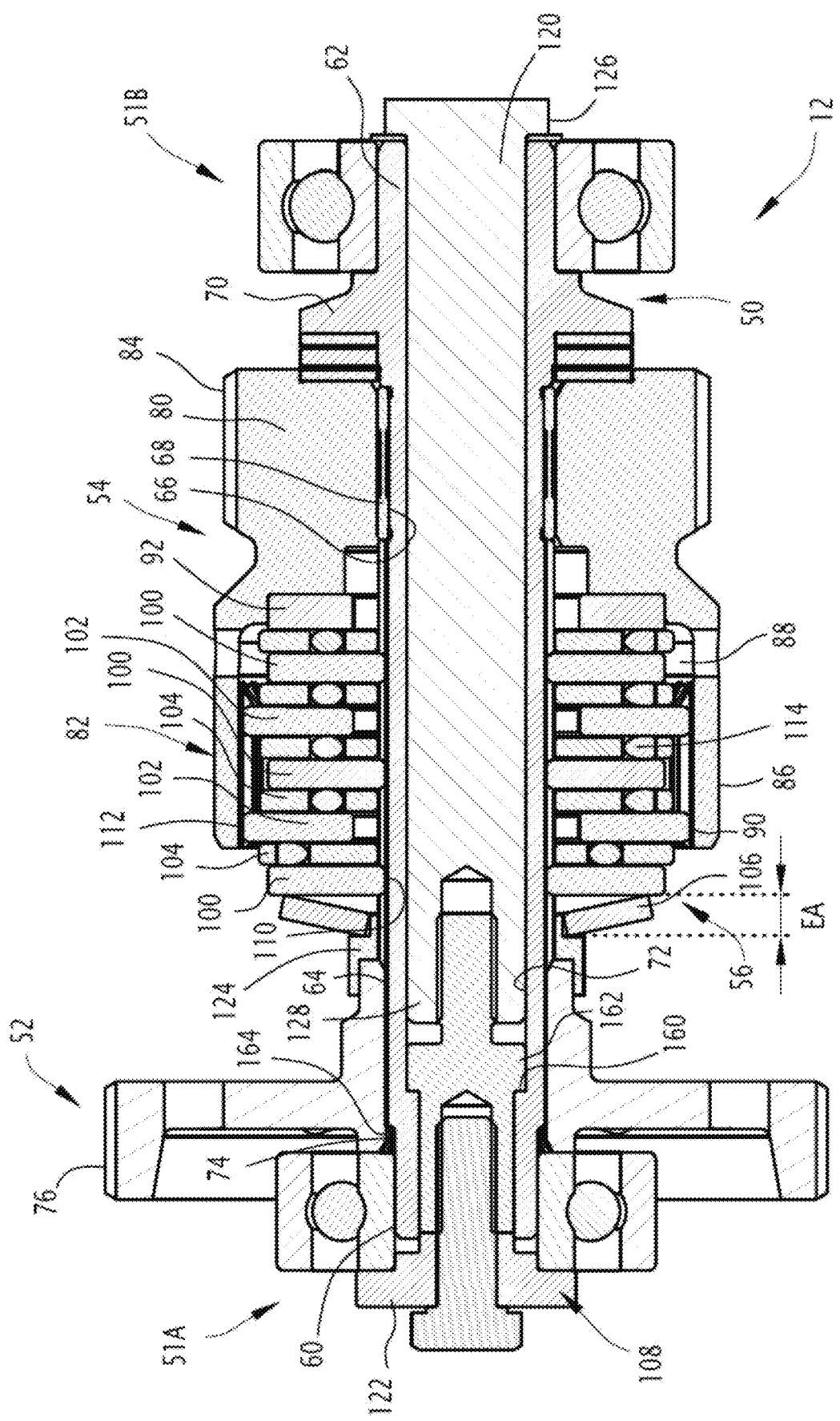
FIG. 7 is a view similar to FIG. 6 of the second torque limiter according to the present disclosure at ambient temperature.
Figure 8:
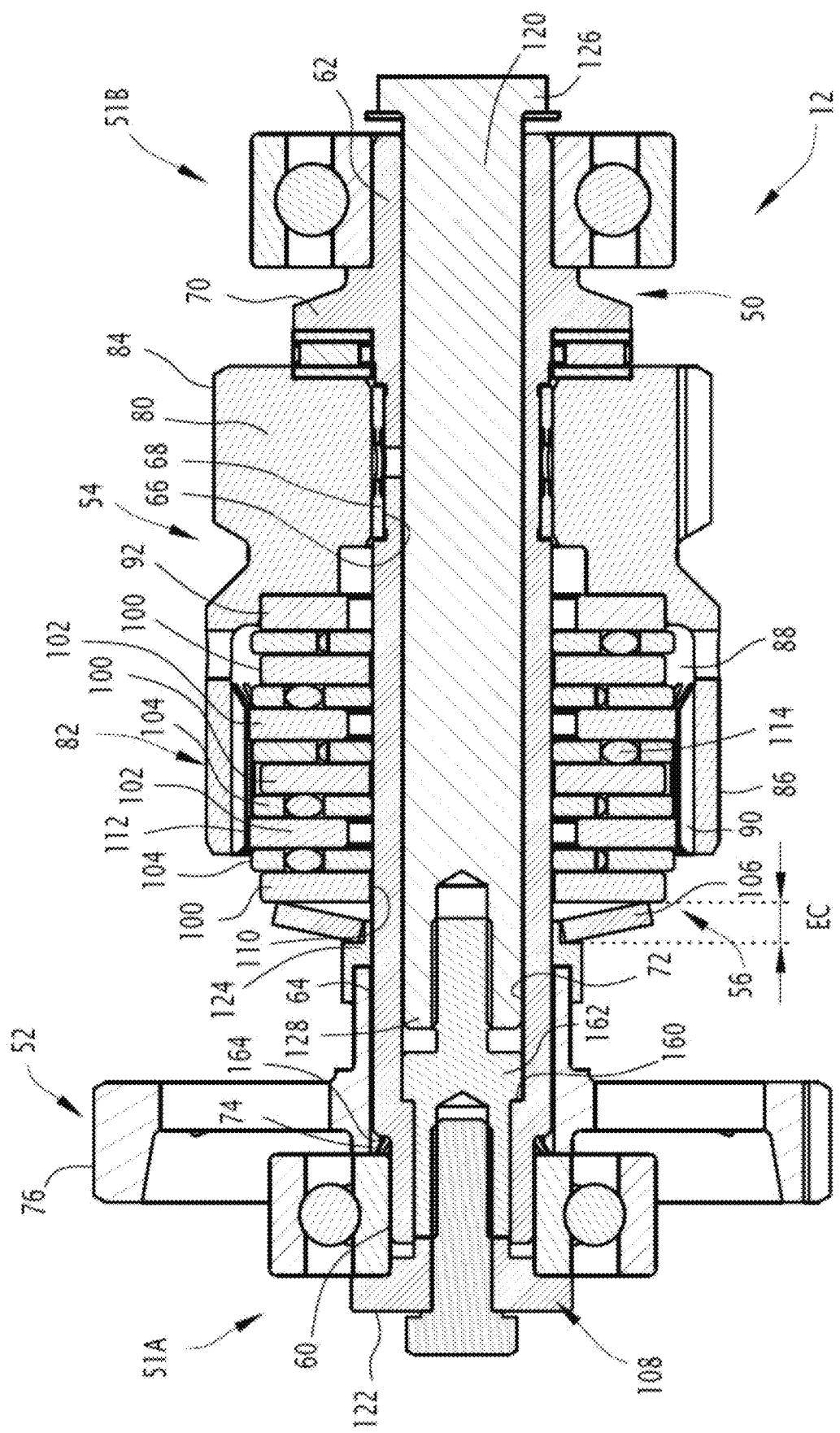
FIG. 8 is a view similar to FIG. 6 of the second torque limiter according to the present disclosure subject to heat.

The torque limiter 12 shown in FIGS. 6 to 8 differs from that illustrated in FIG. 4 in that a bearing 160 blocking the movement of the movement member 120 is provided in the bore 72 of the rotary shaft 50, for example in the form of a shoulder, in order to limit the differential expansion between the movement member 120 and the rotary shaft 50 to a maximum value during the operation at temperatures above that of the initial adjustment.

In this example, the movement member 120 is further provided with a head 162 defining a complementary stop surface 164 configured to come into contact with the shoulder of the bore 72. The head 162 is screwed to the end of the rod of the movement member 120.

The stop 122 is mounted on the head 162. The cooperation between the stop surface 164 and the blocking bearing 160 limits the decrease in the clamping produced by the clamping member 106, when the temperature reaches the adjustment temperature of the limiter 12 (see FIG. 7), then increases again (see FIG. 8).

This modification limits the abatement of the available force when the torque limiter 12 according to the present disclosure is exposed to a temperature higher than the initial adjustment temperature of the limiter 12 (about 20° C.).

Thus, when the torque limiter 12 is exposed to a high temperature, the expansion of the movement member 120 has little influence on the axial force imposed on the clamping member 106. Indeed, although the blocking bearing 160 abutting against the surface 164 limits the movement of the end 128 of the movement member 120, on the left in FIG. 8, the movement member 120 is free to expand on the side of its other end 126.

Thus, as visible in FIGS. 7 and 8, the hot axial extension EC of the clamping member 106 remains substantially equal to the axial extension EA of the clamping member 106 at the adjustment temperature.

The triggering torque in a hot climatic environment (+85° C. in our case) therefore does not harm the available force value developed by the actuator.

The stack of parts of the disengageable system 56 is further contained in a smaller space requirement between the rotary shaft 50 and the stop wedge 122 by the blocking bearing 160.

What is claimed is:

1. An aircraft actuator torque limiter configured to be mounted between a motor and an actuating member mover configured to be driven in rotation by the motor, the torque limiter comprising:

a rotary shaft configured for rotating about a rotation axis, the rotary shaft being formed from a first material having a first thermal expansion coefficient;

a driven member configured for being driven in rotation about the rotation axis by the rotary shaft, one of the rotary shaft and of the driven member being configured to be connected to the motor, another one of the rotary shaft and the driven member being configured to be connected to the actuating member mover;

a disengageable torque transmitter configured to transmit torque between the rotary shaft and the driven member, the disengageable torque transmitter comprising a friction pack including at least one contact member mounted secured in rotation with the rotary shaft and a complementary contact member mounted secured in rotation with the driven member, the complementary contact member being configured to be rotated by the rotary shaft about the axis of rotation jointly with the contact member if the torque applied between the contact member and the complementary contact member is below a torque threshold value, the complementary contact member being rotatable relative to the contact member about the axis of rotation if the torque applied between the contact member and the complementary contact member is greater than or equal to the threshold value, the disengageable transmitter including a friction pack clamp to clamp the friction pack comprising the contact member and the complementary contact member, along the axis of rotation, the disengageable transmitter including a clamp mover configured to move the friction pack clamp, the clamp mover being configured to contract or expand differentially relative to the rotary shaft and relative to the friction pack along the axis of rotation during a temperature variation, the clamp mover being made from a second material having a second thermal expansion coefficient different from the first thermal expansion coefficient of the first material forming the rotary shaft.

2. The aircraft actuator torque limiter according to claim 1, wherein the second thermal expansion coefficient is greater than the first thermal expansion coefficient.

3. The aircraft actuator torque limiter according to claim 2, wherein the absolute value of the difference between the first and second thermal expansion coefficients is greater than $10^{-6}$ mm/mm/° C.

4. The aircraft actuator torque limiter according to claim 1, wherein the clamp mover is housed in a bore arranged in the rotary shaft.

5. The aircraft actuator torque limiter according to claim 4, wherein the clamp mover is a rod.

6. The aircraft actuator torque limiter according to claim 1, wherein the disengageable transmitter includes a transmission stop secured in translation with the clamp mover, the transmission stop being configured to move toward the friction pack clamp to increase the clamping applied on the friction pack comprising the contact member and the complementary contact member along the axis of rotation during a differential contraction of the clamp mover relative to the rotary shaft, the transmission stop being configured to move away from the friction pack clamp to decrease the clamping applied on the friction pack comprising the contact member and the complementary contact member along the axis of rotation during a differential expansion of the clamp mover relative to the rotary shaft.

7. The aircraft actuator torque limiter according to claim 1, wherein the rotary shaft defines a blocking bearing of a longitudinal movement of the clamp mover during a differential expansion between the rotary shaft and the clamp mover.

8. The aircraft actuator torque limiter according to claim 1, wherein the friction pack clamp includes a spring washer.

9. The aircraft actuator torque limiter according to claim 1, wherein the friction pack includes an intermediate friction member between the contact member and the complementary contact member.

10. The aircraft actuator torque limiter according to claim 1, further comprising a rotary input secured in rotation with the rotary shaft, the rotary input being translatable on the rotary shaft along the axis of rotation during a differential contraction or a differential expansion of the clamp mover.

11. The aircraft actuator torque limiter according to claim 1, comprising a smooth guide bearing to guide the driven member, the driven member being mounted rotatably on the rotary shaft via the smooth guide bearing, the rotary shaft delimiting an annular housing receiving the smooth guide bearing.

12. An aircraft actuator including:
a motor;
a mobile actuating member;
an actuating member mover, configured to be driven by the motor; and
the torque limiter according to claim 1 inserted between the motor and the actuating member mover.

13. The actuator according to claim 12, wherein the motor is configured to rotate the rotary shaft, the driven member being connected to the actuating member mover.

14. An aircraft comprising:
a mobile surface; and
the actuator according to claim 12, the actuator being configured to move the mobile surface.

15. The aircraft according to claim 14, wherein the mobile surface is a flap.

16. A method of using an aircraft actuator including:
providing the actuator according to claim 12 at a first temperature; and
during a temperature variation, differentially contracting or expanding the clamp mover relative to the rotary shaft along the axis of rotation.

* * * * *